Patented Dec. 18, 1928.

1,695,626

UNITED STATES PATENT OFFICE.

ARTHUR WOLFRAM AND HEINRICH GREUNE, OF HOCHST-ON-THE-MAIN, GERMANY, ASSIGNORS TO GRASSELLI DYESTUFF CORPORATION, OF NEW YORK, N. Y., A CORPORATION OF DELAWARE.

BZ-METHYL BENZANTHRONES AND PROCESS FOR PREPARING THE SAME.

No Drawing. Application filed November 28, 1925, Serial No. 72,033, and in Germany December 4, 1924.

This invention relates to Bz-methylbenzanthrones and processes for preparing the same.

We have found that anthracenes containing an oxygen atom in the meso position, such as anthrones, anthranols or oxanthranols, can be condensed by means of a condensing agent with crotonic aldehyde to Bz-methylbenzanthrones. In some cases it is advantageous to add to the condensing agent—the most suitable being sulfuric acid—oxidizing substances such as arsenic acid, HgO or HgSO$_4$. It is also advantageous to conduct the reaction in the presence of a diluent. The sulfuric acid is mixed with water and an organic solvent such as glacial acetic acid or chlorobenzene.

The reaction takes place in two stages. It must be assumed that in the first stage there occurs an addition of the aldehyde on the anthranols, whereas the closure of the ring occurs in the second stage. The constitution of the intermediate product is not known. The final product is a Bz-methylbenzanthrone of the following formula:

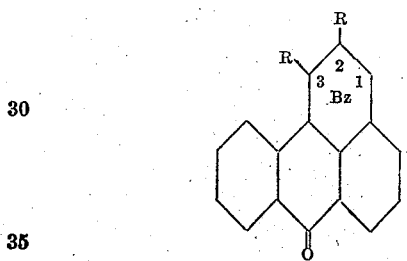

wherein one R stands for a methyl group and the other for hydrogen. It is not known with certainty whether the CH$_3$ group is in the Bz-2- or Bz-3-position. The two steps can be carried out separately or in a single operation. For the primary phase the most suitable condensing agents are acids, such as hydrochloric acid or sulfuric acid, and also bases such as piperidine or the like.

The condensation with bases may be effected by heating anthrone and crotonic aldehyde in presence of pyridine and piperidine. The intermediate products obtainable in this way may then be converted into the Bz-methylbenzanthrones either in the manner above indicated or by heating them with aluminium chloride. The products obtained by means of aluminium chloride are not identical with those obtained by means of sulfuric acid. Apparently, the products in one case are Bz-2-methylbenzanthrones and in the other Bz-3-methylbenzanthrones.

The Bz-methylbenzanthrones thus produced are valuable intermediate products for the preparation of dyestuffs.

The following examples serve to illustrate our invention, the parts being by weight:

1. 30 parts of arsenic acid are dissolved in a mixture of 50 parts by volume of concentrated sulfuric acid, 30 parts of water and 50 parts by volume of glacial acetic acid and the liquid is heated to 115–120° C. This constitutes the oxidation mixture. In a separate container there are then dissolved 20 parts of anthranol and 10 parts of crotonic aldehyde in 50 parts by volume of glacial acetic acid by heating the whole on the water bath. The resulting anthranol-solution is introduced in small portions, while well stirring, into the oxidation mixture which first assumes a deep-red and afterwards a brownish-red color. The last mentioned operation is carried out at 115–120° C. during the course of about ¾ hour and the mass is then kept at the same temperature for about a similar length of time. The resulting solution is poured on ice and the precipitated brown substance is filtered off by suction. For the purpose of purifying it it is distilled by means of steam superheated up to 300° C. After having extracted any small quantities of anthraquinone by dissolving it by reduction and filtering it, a light brown mass is obtained which constitutes a rather pure Bz-methylbenzanthrone. By a recrystallization from methyl alcohol the product is obtained in a pure state. It forms golden-yellow prisms which melt at 113–114° C. In concentrated sulfuric acid the Bz-methylbenzanthrone dissolves to a brilliant orange-yellow solution with a similar fluorescence. The Bz-methylbenzanthrone has the following formula:

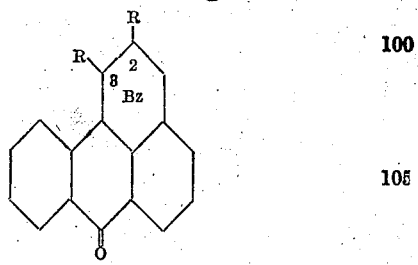

wherein one R stands for a methyl group and the other for hydrogen. It is not known with certainty whether the CH₃ group is in the Bz-2- or Bz-3-position.

2. 20 parts of anthranol are suspended in a mixture of 12 parts of crotonic aldehyde and 100 parts by volume of chlorobenzene. There is then introduced at 0° to +3° C., while stirring, a stream of dry hydrogen chloride until saturation. The anthranol soon dissolves to a dark yellow solution. The mixture is left alone for some time and the solvent is then distilled off by steam. There remains a yellow resin which is soluble in ether and which is subjected to a further condensation with an oxidizing agent as described in Example 1.

3. An oxidation mixture consisting of 30 parts of arsenic acid, 50 parts by volume of concentrated sulfuric acid, 30 parts of water and 50 parts by volume of glacial acetic acid is heated to 110–115° C. as described in Example 1. In a separate container there are dissolved 20 parts of α-hydroxyanthranol (melting point 133–135° C. see U. S. Patent specification No. 1,025,174) and 10 parts of crotonic aldehyde in 50 parts by volume of glacial acetic acid by heating the whole on the water bath. The solution of the α-hydroxyanthranol is then introduced, while well stirring, into the oxidation solution whereupon the latter first acquires a red and then a brownish-red color. The internal temperature is maintained for about one hour at 125° C. After cooling, the solution is poured on ice and the separated substance is filtered off by suction. The Bz-methyl-hydroxybenzanthrone is purified as stated in Example 1 by distillation with superheated steam and the product, when dry, is recrystallized from ligroine. The product thus obtained forms yellow needles which dissolve in hot, dilute caustic soda solution to a reddish-brown solution. From the solution, when cold, the sodium salt of the compound separates. In concentrated sulfuric acid the Bz-methyl-hydroxybenzanthrone dissolves to a yellow solution with an intense yellowish-green fluorescence. The position of the OH group in the anthracene nucleus and of the CH₃ group in the Bz-nucleus is not known.

4. 19,4 parts of anthrone and 7 parts of crotonic aldehyde are heated to boiling under reflux with 70 parts of anhydrous pyridine and 2 parts of piperidine for about 6 hours. The mixture is then introduced into hydrochloric acid (two molecules of HCl + one molecule of H₂O), filtered and washed with dilute hydrochloric acid and finally with water. The yellowish-brown residue is treated with acetone, filtered and the liquor is precipitated by means of glacial acetic acid. The resulting product is filtered, washed and dried.

10 parts of the condensation product obtained in the above way are intimately mixed with 70 parts of aluminium chloride or of NaCl; Al₂Cl₆ and this mixture is gradually heated for a short time to 80–150° C. The melt is decomposed by adding hydrochloric acid and water whereupon it is thoroughly extracted by means of hydrochloric acid and dried. The mass is then extracted with alcohol and the solution precipitated by adding water. For eliminating the admixed portion of anthraquinone, it is dissolved by reduction and filtered, whereas the residue is distilled off as stated in Example 1 by means of superheated steam. After having re-dissolved the product from an alcohol-benzene mixture, a Bz-methylbenzanthrone is obtained, the solution of which has the same color as that of the ordinary benzanthrone. This Bz-methylbenzanthrone has the formula:

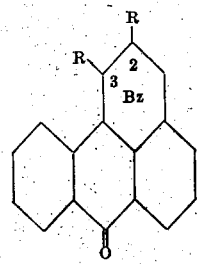

wherein one R stands for a methyl group and the other for hydrogen. It is not known with certainty whether the CH₃ group is in the Bz-2- or Bz-3-position. The said compound forms yellowish crystals which melt at 168° C. and dissolve in concentrated sulfuric acid to an orange yellow solution showing an intense fluorescence. It is not identical with the compound obtained by the process of Example 1. Evidently one compound is the Bz-2-methylbenzanthrone and the other is the Bz-3-methylbenzanthrone.

By the term "and anthracene body containing an oxygen atom in the meso position" we understand an anthracene body containing an oxygen atom or a hydroxy group in the meso-position especially anthranol, anthrol, oxanthrol or a homologue or substitution product thereof.

We claim:

1. Process of producing condensation products of the anthracene series, consisting in condensing an anthracene body containing an oxygen atom in the meso position with crotonic aldehyde in the presence of a condensing agent.

2. Process of producing condensation products of the anthracene series, consisting in condensing an anthracene body containing an oxygen atom in the meso position with crotonic aldehyde in the presence of a condensing and an oxidizing agent.

3. Process of producing condensation products of the anthracene series, consisting in condensing an anthracene body containing an oxygen atom in the meso position with crotonic aldehyde by a two stage reaction, one stage of which is carried out in the presence of an acid condensing agent.

4. Process of producing condensation products of the anthracene series, consisting in condensing an anthracene body containing an oxygen atom in the meso position with crotonic aldehyde by a two stage reaction, one stage of which is carried out in the presence of an acid condensing agent and an oxidizing agent.

5. Process of producing condensation products of the anthracene series, consisting in treating an anthracene body containing an oxygen atom in the meso position with crotonic aldehyde and a basic reagent and effecting the formation of the nucleus by means of an acid condensing agent.

6. Process of producing condensation products of the anthracene series, consisting in condensing an anthracene body containing an oxygen atom in the meso position with crotonic aldehyde by a two stage reaction, one stage of which is carried out in the presence of sulfuric acid.

7. Process of producing condensation products of the anthracene series, consisting in condensing an anthracene body containing an oxygen atom in the meso position with crotonic aldehyde by a two stage reaction, one stage of which is carried out in the presence of sulfuric acid and an oxidizing agent.

8. As new products the compounds of the following formula:

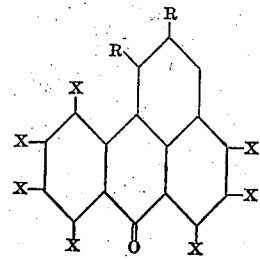

wherein x represents hydrogen or any substituent and one R stands for a methyl group and the other for hydrogen.

9. As new products the compounds of the following formula:

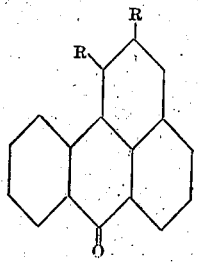

wherein one R stands for a methyl group and the other for hydrogen, said compounds forming yellowish crystals, dissolving in concentrated sulfuric acid to an orange yellow solution showing an intense fluorescence.

10. As a new product the Bz-methylbenzanthrone of the following formula:

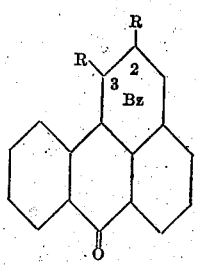

wherein one R stands for a methyl group and the other for hydrogen, which product forms golden-yellow prisms melting at 113° C. to 114° C. and dissolving in concentrated sulfuric acid to an orange yellow solution showing an intense fluorescence.

In testimony whereof, we affix our signatures.

ARTHUR WOLFRAM.
HEINRICH GREUNE.